June 10, 1941.  I. L. RAINES  2,245,050
FILLING FORK
Filed Feb. 28, 1941

INVENTOR.
IRBY RAINES.
BY
ATTORNEY.

Patented June 10, 1941

2,245,050

UNITED STATES PATENT OFFICE 2,245,050

FILLING FORK

Irby Lee Raines, Chester, S. C., assignor to Draper Corporation, Hopedale, Mass., a corporation of Maine Application February 28, 1941, Serial No. 381,105

7 Claims. (Cl. 139—378)

This invention pertains to fly shuttle looms and more particularly relates to filling forks therefor.

Fly shuttle looms are usually provided with a so-called filling fork and grid mechanism which acts to detect the absence of the filling due to exhaustion or breakage and thereupon effect the stopping of the loom or a change in its operation. Such mechanism usually comprises a grid mounted on the lay and having a plurality of generally vertical parallel spaced bars and a fork also having a plurality of generally vertically parallel spaced tines mounted upon the breast beam. These elements co-operate when the lay beats up in such a manner that if filling is present in front of the grid, normal operation of the loom continues, but if filling is absent the co-operative action of the fork and grid will not take place and there will result the stopping of the loom or the desired change in its operation. Occasionally it so happens that the shuttle will stop in front of the grid and when this occurs the tines of the fork will be bent unless provision is made to prevent such bending of the tines.

Prior constructions have provided tines independently pivotally mounted to permit movement when engaged by the shuttle, such constructions however required additional means such as springs to hold the tines in proper position. These constructions have been too complicated to be satisfactory. No prior construction of which I am aware has provided tines characterized by an inherent resiliency throughout their length to return to their original position from any position to which they may be bent.

Accordingly it is a principal object of this invention to provide a filling fork for a filling detecting mechanism for a loom which fork shall have a plurality of tines each of said tines being formed of a helically coiled strip of material thereby giving it an inherent resiliency throughout its length to return to its original position from any position to which it may be bent.

This and other objects of the invention are accomplished by the construction illustrated on the accompanying drawing, wherein.

Figure 1:
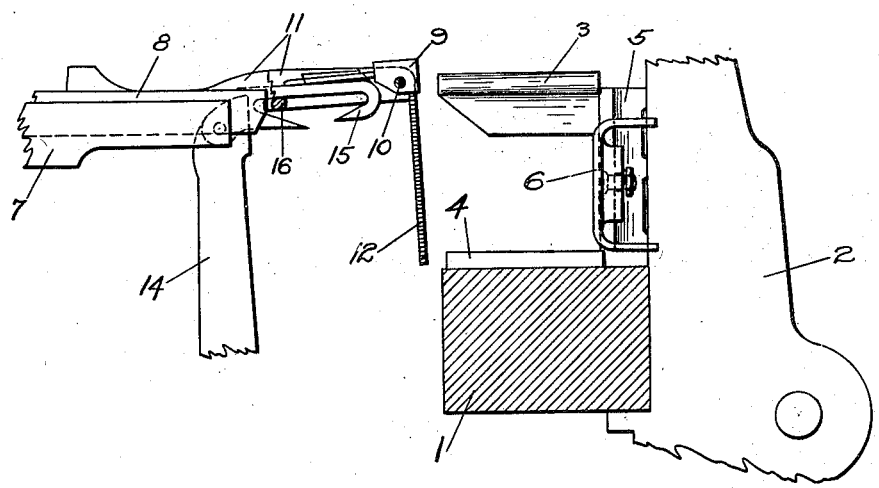
Fig. 1 is a side elevation partly in cross section of the filling fork and grid mechanism of this invention with portion of a loom immediately associated therewith.
Figures 2, 3:
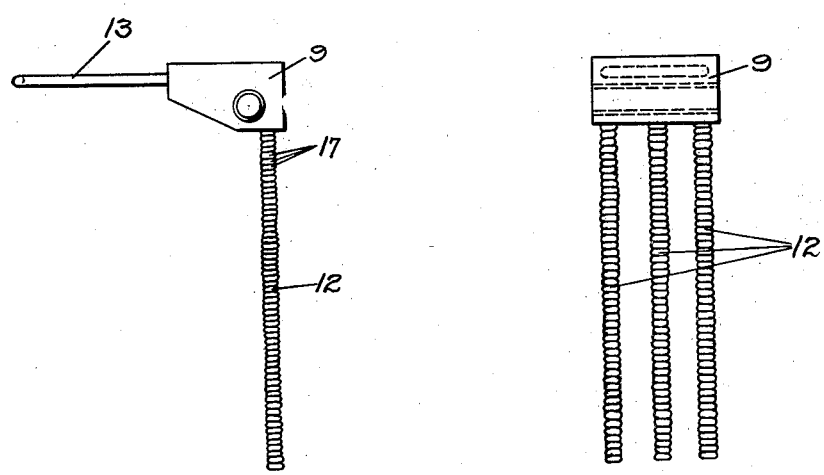
Fig. 2 is a side elevation of the filling fork.
Fig. 3 is a rear elevation of the filling fork.

The drawing shows only a portion of the loom to which my invention has been applied, parts and mechanisms not shown may be of the usual construction and form no part of the present invention.

The drawing shows a lay beam 1 mounted on a sword 2 and part of the left hand shuttle box including the shuttle guard 3, floor plate 4 and back box plate 5. A grid 6 is fixed to the back box plate. A support 7 is mounted on the breast beam, not shown, and carries the usual filling fork slide 8 mounted to slide forwardly and rearwardly therein.

The filling fork may comprise a member 9 pivotally journalled on a bearing 10 between the bifurcated arms 11 of the fork slide 8. From the member 9 depend in spaced parallel relation bars or tines 12 and from the member 9 in a direction generally at right angles to the tines 12 extends the looped tail 13.

The usual weft hammer 14 carries pivoted thereto the hook 15 between the arms 11 of the slide 8 and resting upon the cross bar 16 of the slide 8.

Upon each forward beat of the lay, if the filling is properly laid in front of the grid 6, it is carried by the grid against the tines 12 of the fork, raising the tail 13 out of the path of the hook 15. However, if filling is absent, no movement of the fork takes place and as the weft hammer 14 swings forwardly the hook 15 engages the tail 13 and gives a forward movement to the fork slide which through suitable mechanism, not shown, acts to effect the stopping of the loom or a change in its operation.

It sometimes happens while the loom is in operation that the shuttle will stop in front of the grid. When this occurs on a forward beat of the lay, the shuttle will engage the fork and bend the tines or break them.

This breakage or bending of the tines may be overcome by making the tines sufficiently resilient and elastic as to bend when engaged by the shuttle, but to return to their original shape when the shuttle has been moved.

The tines of my invention accomplish the desired result of bending without breaking and of returning to their original position upon removal of the force causing the bending. This I accomplish by forming the tines so that they will be characterized by having an inherent resiliency throughout their lengths sufficient to return them to their original position from any position to which they may be bent.

One form of tine having this inherent characteristic may be formed by closely helically coiling a strip of material into a tube. The coils should be tightly pressed together so that each coil contacts the preceding coil throughout its length leaving no opening therebetween in which the filling thread may be caught.

The material of which the cylindrical helical coil is made may be a metallic material such as wire or any other suitable material. It is preferred however that the material be a flexible or resilient material.

The tines 12 are shown as tubular helical coils having the individual coils 17 closely pressed together. The coils are made of strips of resilient wire. Such a structure is inherently resilient throughout its length.

Having thus fully describe the preferred embodiment of my invention, I claim:

1. A filling fork for a filling detecting mechanism for a loom, said fork comprising a member having a tail extending laterally therefrom and a plurality of filling engaging tines mounted on said member and extending therefrom in a direction substantially at right angles to said tail, each of said tines being formed of a helically coiled strip of material, each of the coils contacting the preceding coil throughout its length.

2. A filling fork for a filling detecting mechanism for a loom, comprising a member having a tail extending laterally therefrom and a plurality of filling engaging tines mounted on said member and extending therefrom in a direction substantially at right angles to said tail, each of said tines being formed of a closely helically coiled strip of resilient material.

3. A filling fork for a filling detecting mechanism for a loom, said fork comprising a member having a tail extending laterally therefrom and a plurality of filling engaging tines mounted on said member and extending therefrom in a direction substantially at right angles to said tail, each of said tines being formed of a helically coiled strip of material.

4. A filling fork for a filling detecting mechanism for a loom, comprising a member having a tail extending laterally therefrom and a plurality of filling engaging tines mounted on said member and extending therefrom in a direction substantially at right angles to said tail, each of said tines being formed of a closely helically coiled wire.

5. A filling fork for a filling detecting mechanism for a loom, comprising a member having a tail extending laterally therefrom and a plurality of filling engaging tines mounted on said member and extending therefrom in a direction substantially at right angles to said tail, each of said tines consisting of a helically coiled strip of resilient material.

6. A filling fork for a filling detecting mechanism for a loom, comprising a member having a tail extending laterally therefrom and a plurality of filling engaging tines mounted on said member and extending therefrom in an angular relation to said tail, each of said tines consisting of a cylindrical helix of wire.

7. A filling fork for a filling detecting mechanism for a loom, comprising a member having a plurality of filling engaging tines extending laterally therefrom, each of said tines consisting of a tube formed of a strip of metallic material closely wound into a cylindrical helix.

IRBY LEE RAINES.